Aug. 3, 1965　　　F. J. VOELKERDING　　　3,198,265
GAS LEAK DETECTION DEVICE
Filed Dec. 26, 1962　　　　　　　　　　3 Sheets-Sheet 3

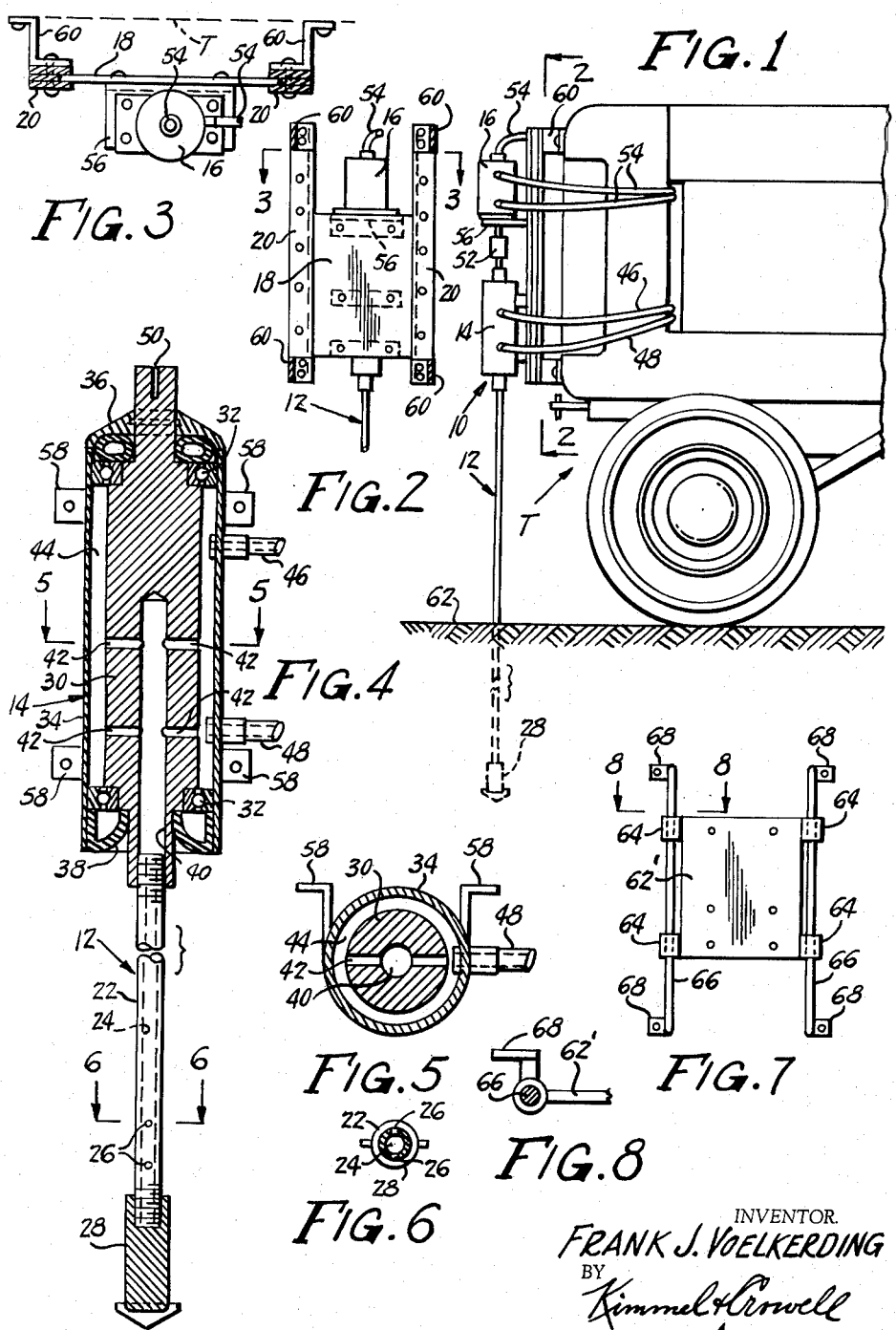

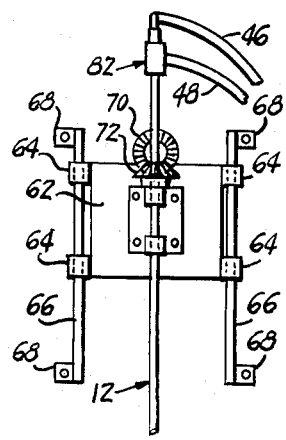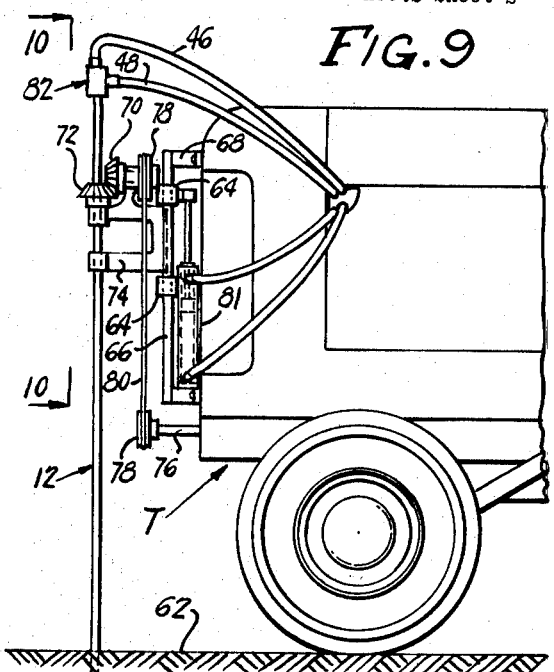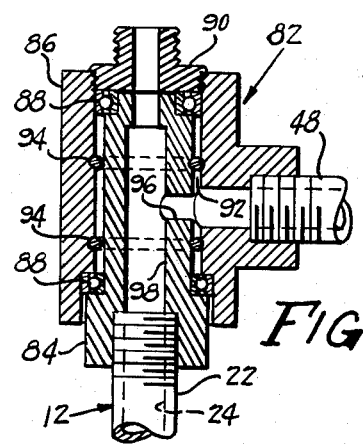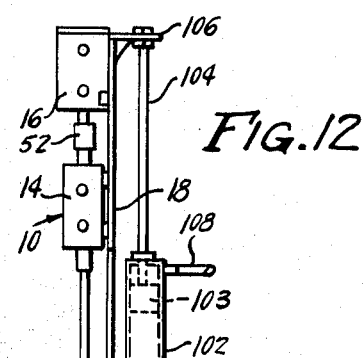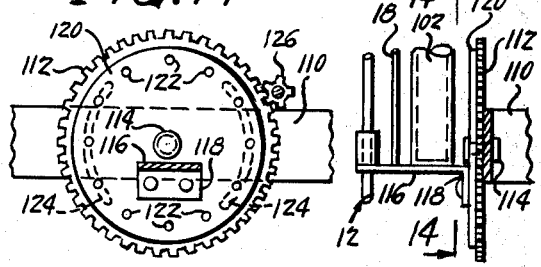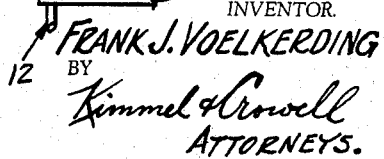

INVENTOR.
FRANK J. VOELKERDING
BY
Kimmel & Crowell
ATTORNEYS.

United States Patent Office 3,198,265
Patented Aug. 3, 1965

3,198,265
GAS LEAK DETECTION DEVICE
Frank J. Voelkerding, 118 Madison, Lake City, Iowa
Filed Dec. 26, 1962, Ser. No. 246,965
4 Claims. (Cl. 173—74)

This invention relates to a gas leak detection machine and relates more particularly to a device wherein a drill may be inserted into the ground or into a building wall to detect the presence of a fluid leak, either gaseous or liquid.

A primary object of this invention is the provision of a device of the type described wherein a detection drill may be slidably and rotatably mounted on a mobile carrier to facilitate insertion of the drill into an area to be tested.

A further object of this invention is the provision of a gas leak detection device wherein the drill has a bit at its lower end and means to rotate it adjacent its upper end.

Another object of the instant invention is to provide such a device having means to positively force the drill into the area to be tested and withdraw the same after the test has been completed.

A still further object of this invention is to provide a detection device wherein the drill may be positioned at an angle for insertion into a wall or other area normally relatively inaccessible.

Another object of the instant invention is the provision of a device of the character described which may be operated from the power take-off on a tractor or the like.

An additional object of this invention is to provide a gas leak detection device having means to force dirt or the like out of the drill after it has been inserted into the area to be tested and additional means to withdraw vapor or liquid through the drill into a device which will indicate to the operator the presence of a leak.

Other and further objects reside in the combination of elements, arrangements of parts, and features of construction.

Still other objects will in part be obvious and in part be pointed out as the description of the invention proceeds and as shown on the accompanying drawings wherein there are disclosed preferred embodiments of this inventive concept.

In the drawings:

FIGURE 1 is a side elevational view of a gas leak detection machine in accordance with the instant invention, mounted on a mobile carrier, with parts broken away for illustrative convenience;

FIGURE 2 is a rear elevational cross-sectional view taken on line 2—2 of FIGURE 1, with parts broken away;

FIGURE 3 is a transverse cross-sectional view taken on line 3—3 of FIGURE 2;

FIGURE 4 is a longitudinal view to an enlarged scale, partly in cross-section and partly broken away for illustrative convenience, of one form of drill and supporting quill in accordance with the instant invention;

FIGURE 5 is a transverse cross-sectional view of the supporting quill of the instant invention taken on line 5—5 of FIGURE 4;

FIGURE 6 is a transverse cross-sectional view of the drill of the instant invention taken on line 6—6 of FIGURE 4;

FIGURE 7 is a front elevational view of a modification for the mounting plate securing the device of the instant invention to a mobile carrier;

FIGURE 8 is a fragmentary transverse cross-sectional view to an enlarged scale, taken on line 8—8 of FIGURE 7;

FIGURE 9 is a side elevational view of a modified form of the device of the instant invention mounted on a mobile carrier, with parts broken away for illustrative convenience;

FIGURE 10 is a front elevational view of this embodiment taken on line 10—10 of FIGURE 9, with parts broken away;

FIGURE 11 is an enlarged, fragmentary, longitudinal cross-sectional view of one form of a rotating union to be used with the embodiment of FIGURE 9;

FIGURE 12 is a fragmentary side elevational view of a further embodiment of the machine of the instant invention, this embodiment having hydraulic means to positively raise and lower the drill;

FIGURE 13 is a fragmentary side view, partly in section, of yet another embodiment which provides means for positioning the drill at an angle to the vertical to assist in testing otherwise relatively inaccessible areas;

FIGURE 14 is a fragmentary front elevational view taken on line 14—14 of FIGURE 13;

Similar reference characters refer to similar parts throughout the several views of the drawings.

Figure 15:
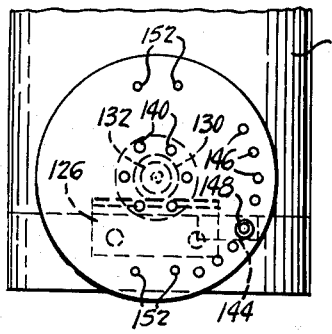
FIGURE 15 is an enlarged fragmentary front elevational view of another embodiment of means for positioning the drill at an angle.

Referring now to the drawings in detail and more particularly to FIGURE 1, reference numeral 10 indicates generally a gas leak detection device or machine in accordance with the instant invention. A mobile carrier, such as a tractor T, may be used to support the device 10 and it is to be understood that while the device 10 is shown as mounted on the front end of the tractor T, it can be similarly supported on the sides or rear of the tractor or on a pickup truck or the like.

In the embodiment of FIGURES 1-6, the gas leak detection device 10 is comprised basically of a drill 12, a supporting quill 14, a hydraulic motor 16, a mounting plate 18, and a pair of slideways 20.

The drill 12 includes an elongated member 22 having means defining a longitudinal bore 24 therethrough and a plurality of ports 26 communicating with the longitudinal bore 24 and with the exterior of the elongated element 22 adjacent the lower end of the drill 12. Threadably secured to the lower end of the drill 12 is a drill bit or auger 28 having a carbide steel tip or the like and having any desired shape.

Threadably secured to the upper end of the drill 12 is a shaft 30 of the quill 14 rotatably supported by ball bearings 32. It is to be understood that these elements may be keyed or otherwise coupled. In circumjacent relationship to the shaft 30 is a barrel member 34 having sealing means 36 and 38 adjacent its upper and lower ends, respectively.

Any conventional means may be used to rotatably support the shaft 30 within the barrel 34 and to seal the same against air and vacuum leakage for a purpose to be described further hereinafter.

A longitudinal bore 40 is defined over a portion of the length of the shaft 30 and is in communication at its lower end with the longitudinal bore 24 in the drill 12. The longitudinal bore 40 communicates by vent holes 42 with an annular passageway 44 defined between the barrel 34 and the shaft 30. A conduit 46 is in communication with the annular passageway 44 at one end and is connected to a source of air under pressure (not shown) at its other end which may preferably be the air line on the tractor T. A second conduit 48 is also in communication with the annular passageway 44 at one end and is connected to a source of a vacuum (not shown), preferably the vacuum line or a vacuum pump in the tractor T, at its other end.

The shaft 30 of the quill 14 has its upper end connected as by means of a keyway 50 to a conventional coupling element 52 which in turn is keyed to the shaft of the hydraulic motor 16 for rotation therewith. Various oil lines 54 are operatively connected between the hydraulic motor 16 and a source of motive fluid within the tractor T.

The hydraulic motor 16 is secured to the mounting plate 18 by a base plate 56 and the quill 14 is secured to the mounting plate 18 by a plurality of brackets such as 58. The mounting plate 18 is slidably supported within the slideways 20 which in turn are mounted on the tractor T by brackets or the like 60.

The use and operation of the gas leak detection machine 10 of FIGURES 1-6 will now be apparent. The tractor T or other mobile carrier can position the device 10 over an area having a suspected leak and the drill 12 can then be drilled into the ground by rotating the shaft 30 through the hydraulic motor 16, which in turn will rotate the drill 12 and its drill bit 28 to cut through the earth 62 which is normally relatively soft and free from rocks or the like over a gas or other main. The weight of the device 10 will cause it to be lowered within the slideways 20 as the drill bit 28 enters the ground 62.

Any conventional means may be used to retain the device 10 out of operative contact with the ground 62 when it is not in use. The drill 12 may be formed in sections (not shown) to assist in storage of the same and may be removed from the quill 14 during traveling. A section may be inserted into the shaft 30 and the device 10 may be raised in the slideways 20 and lowered under the cutting action of the bit 28 until the drill 12 has been inserted a substantial distance into the ground. If desired, an additional section of drill 12 may then be secured between the bit 28 and the quill 14 and the device again raised in the slideways 20 to provide for additional depth of insertion.

Once the drill 12 has been positioned within the ground 62 to a point where a leak is suspected, the ports 26 and the longitudinal bore 24 within the drill 12 may be freed of any dirt or dust picked up during the drilling operation by blowing a blast of air under pressure through the conduit 46, the annular passageway 44, the vents 42 and the longitudinal bore 40 in the shaft 30. Then, a vacuum may be drawn through the conduit 48 to withdraw any gas or moisture in the vicinity of the ports 26 for testing by a means not shown.

A set of controls may be provided on the dashboard or instrument panel of the mobile carrier, such as the tractor T, so that the operator may initiate the hydraulic system for the motor 16, the pressure and vacuum for the lines 46 and 48, respectively, and the meter or other indicating device used to detect the presence of a leak.

Various instruments are well known in the art to indicate the presence of gas, such as explosion meters and the like, and a number of devices are conventional to detect water vapor and thereby indicate a leak in a water main. Since these devices do not form a part of the instant invention, they will not be set forth in further detail.

Other means may be provided to slidably support the detection machine 10, such as the mounting plate 62 shown in FIGURES 7 and 8. This modification has a plurality of brackets 64 slidably secured over rods 66 which are fixed as by brackets 68 to the tractor T or other mobile carrier.

The use of such a device will obviously be similar to the operation of the embodiment of FIGURES 1-6.

Other means may also be provided to rotate the drill 12, such as the bevel gears 70 and 72 shown in FIGURES 9 and 10. The drill 12 will be keyed within the driven gear 72 and slidably supported within the bracket 74. The bracket 74 will in turn be fixed to a mounting plate, such as 62 of FIGURES 7 and 8, which may be slidably supported on the rods 66 fixed to the tractor T. Driving gear 70 can be operatively connected to the power take-off 76 on the tractor T through a pair of pulleys 78 and a V-belt or the like 80. With this type of connection it is apparent that the mounting plate 62 may be slid upwardly on the rods 66 by the hydraulic cylinder 81 to provide the proper tension in the V-belt 80 and then secured in place by means not shown.

Other motive means may be used to rotate the drill 12 from the power take-off 76, such as a gear train (not shown) or the like.

A rotating union 82 is affixed to the upper end of the drill 12 to allow for the connection of the air pressure and vacuum conduits 46 and 48, respectively, similar to the embodiments of FIGURES 1-6. This union may take any well known form and a particular embodiment is shown in detail in FIGURE 11. In this construction the drill 12 is threadably secured to a shaft 84 which in turn is rotatably supported within a collar 86 by bearings such as 88. Fixed for nonrotation with the collar 86 is a hollow nipple 90 to which may be secured the conduit 46 leading to a source of air under pressure within the tractor T. Also fixed to the collar 86 is the vacuum line 48 which communicates with an annular passageway 92 defined between the shaft 84 and the collar 86. A pair of O-rings or other sealing means 94 close the annular passageway 92 above and below a transverse vent 96 leading to a longitudinal bore 98 in communication with the longitudinal bore 24 in the drill 12.

It will be apparent that the embodiment of FIGURES 9-11 functions in a similar manner to the earlier described embodiments of this detection device.

The drill 12 may be positively driven into the ground and raised therefrom as shown in the embodiments of FIGURES 12-14 rather than relying upon the weight of the device 10 and the rotation of the drill bit 28. In FIGURE 12, a base plate 100 supports the device 10 and is secured to the tractor T or other mobile carrier in any conventional manner. A hydraulic cylinder 102 is vertically supported on one side of the mounting plate 18 which is slidably supported as shown in the embodiment of FIGURES 1-6. This cylinder 102 has a piston 103 carrying a piston rod 104 fixed at its upper end to a bracket 106 secured to the mounting plate 18. Conduit means 108 communicate with the hydraulic cylinder 102 and to a fluid source (not shown) to raise and lower the device of the instant invention in a manner which will now be apparent.

It is also possible to provide means for angularly displacing the drill 12 with respect to the vertical as illustrated in FIGURES 13 and 14 to assist the same in being used to drill for suspected leaks in service lines located, for example, in a building wall. A bracket 110 is secured to the tractor T and ring gear or plate 112 is rotatably supported thereon by a king pin 114. The hydraulic cylinder 102, mounting plate 18, and drill 12 are supported on a base plate 116 fixed by a flange 118 to a positioning plate 120 which is also rotatably supported on the king pin 114. The positioning plate 120 has a plurality of holes 122 defined about its periphery and the ring gear 112 has a pair of arcuate slots 124 which communicate with the holes 122. A plurality of bolts or the like (not shown) may be inserted through the holes 122 and the arcuate slots 124 to fix the relationship of the positioning plate 120 and the ring gear 112. A hand-cranked or hydraulically actuated pinion gear or worm gear 126 is operatively connected to the ring gear 112 to set the probe 12 at various angles up to approximately 45° to the right or 45° to the left and then to be driven by the hydraulic cylinder 102 and the hydraulic motor 16 into the area where a leak is suspected.

Figure 16:
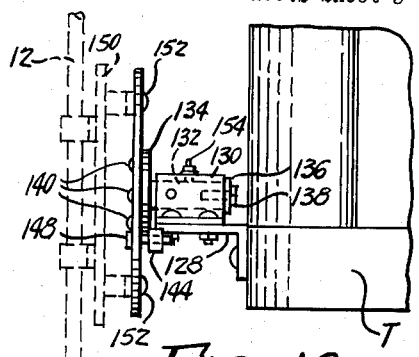
FIGURE 16 is a side elevational view of the embodiment of FIGURE 15 with a portion mounting plate and drill shown in dotted lines.

Another means for varying the angle of the drill 12 is shown in FIGURES 15 and 16 wherein an angular plate 128 is affixed to the tractor T and a sleeve 130 is secured thereto. Rotatably mounted in the sleeve 130 is a kingpin 132 secured at one end to a plate 134 and fixed within the sleeve 130 by a washer 136 and bolt 138. The plate 134 is secured by means 140 to a positioning plate 142 having a plurality of peripheral apertures 146. An ear 144 is secured to the angular plate 128 and has an aperture therein aligned with the peripheral apertures 146 on the positioning plate 142. By rotating the positioning plate 142 about its kingpin mounting 130, 132, a chosen peripheral aperture can be aligned with the apertured ear 144 and a pin 148 can then be inserted to secure the relationship of these elements. The mounting plate 150 for the drill 12 is secured to the positioning plate 142 by any conventional means at 152. A grease fitting 154 is provided in the sleeve 130.

Figure 17:
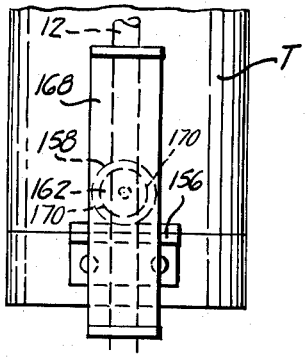
FIGURE 17 is an enlarged fragmentary front elevational view of a further embodiment of means for angling the drill.
Figure 18:
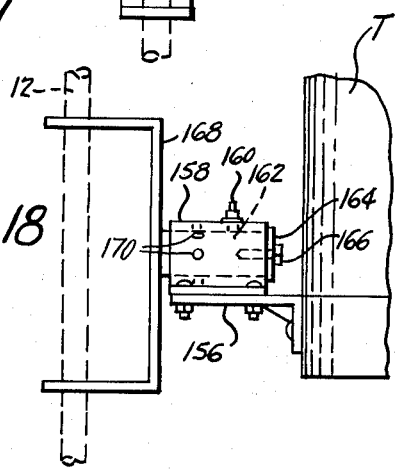
FIGURE 18 is a side elevational view of the embodiment of FIGURE 17.

A modified angling means is shown in FIGURES 17 and 18 wherein an angled plate 156 is secured to the trailer T and a sleeve 158 having a grease fitting 160 and similar to the sleeve 130 is mounted thereon. A kingpin 162 is secured in the sleeve 158 by a washer 164 and bolt 166 and is fixed to a bracket 168 at its other end having means for slidably securing the drill 12. A plurality of circumferentially spaced apertures 170 are defined in the sleeve 158 and in the kingpin 162 and a pin (not shown) may be inserted in aligned apertures 170 to secure the relationship of the elements.

Figure 19:
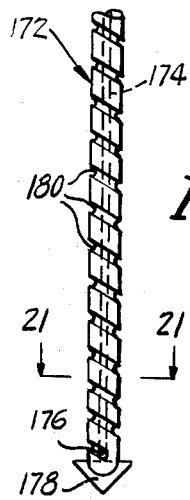
FIGURE 19 is an enlarged side elevational view of one embodiment of a drill in accordance with the instant invention, with parts broken away for illustrative clarity.
Figures 20, 21:
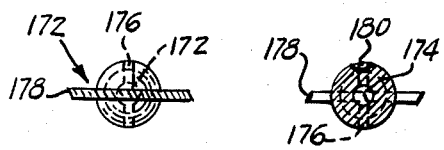
FIGURE 20 is a bottom plan view of the drill of FIGURE 19.
FIGURE 21 is a transverse cross-sectional view taken on line 21—21 of FIGURE 19.

A preferred embodiment of the drill 12 of the instant invention is shown in FIGURES 19–21 and is generally indicated at 172. The drill 172 has a longitudinally extending bore 174 therethrough communicating with ports 176 adjacent its lower end. Secured to its lower end is a bit 178 and the outside of the drill 172 has a helical flight 180 to assist in the drilling process.

It has been found advantageous that once a test hole is made in a hard material, such as a building wall or a sidewalk, to insert a plastic tube with a cap thereon to avoid the seepage of water into the hole which might cause the material to crack and also to provide a permanent test hole by simply removing the cap in the future. This procedure saves time and cost of leak detection.

Another device that can be installed on the machine is a time tape which has a paper web to record the results of the leak tests and on which may be marked the street and particular house or business address at which each test is taken.

It can now be seen that there is herein provided a device which satisfies all of the objects of the instant invention and others, including many advantages of great practical utility and commercial importance.

Since many embodiments may be made of this inventive concept and since many modifications may be made of the embodiments hereinbefore shown and described, all matter herein is to be considered as merely illustrative, and not in a limiting sense.

I claim:
1. A machine for detecting leaks of fluid in, and removing said fluid from, a definite area to be tested, in ground and building walls, comprising in combination:
  (a) a mobile carrier;
  (b) a rotatable drill assembly insertable into and removable from said area, comprising an elongated tubular member having an upper end and a lower end an a longitudinal bore, and of a drill bit threaded onto said lower end;
  (c) driving and rotating means connected to the upper end portion of said drill assembly;
  (d) a plurality of apertures located in the lower portion of said drill member, in the tubular member thereof, and communicating through the wall of said tubular member with said bore and with the exterior of said tubular member;
  (e) separate means adapted to impose in said bore a pressure and a vacuum, respectively;
  (f) a mounting plate in front of said rigid support, and movable up and down relative to said support, on vertical slideways attached to the vertical sides of said support;
  (g) supporting means projecting outwardly from said mounting plate and at right angle thereto, and supporting said driving and rotating means;
  (h) driving and rotating means consisting of a vertical driving bevel gear rotatingly attached to said mounting plate and driven by the power take-off of said mobile carrier, and of a horizontal driven bevel gear meshing with said driven gear and supported by said supporting means;
  (i) a keyed connection between said tubular member of said drill assembly and said horizontal bevel gear, said tubular member being slidable in said supporting means;
  (j) a union affixed to the upper end of said tubular member and having an outer body and an inner rotating member;
  (k) an internal bore from the top to the bottom of said outer body, through said rotating member, the bottom of said rotating member being keyed to said tubular member, said internal bore being in open communication with the inner bore of said tubular member;
  (l) said internal rotating member and internal bore being coaxial with said tubular member;
  (m) a leak-proof connection between the upper end of said internal bore and pressure exerting means;
  (n) a lateral duct through the walls of said outer body and internal rotating member, and vacuum producing means connected to said duct in the wall of said outer body;
  (o) said pressure exerting means and said vacuum producing means being operated from sources of pressure and vacuum in said mobile carrier.

2. A machine as claimed in claim 1, further provided with hydraulic means connected to said mounting plate and adapted to raise and lower said mounting plate and its connected drill assembly, said hydraulic means being supported by a frame connected to said mobile carrier.

3. A machine for detecting leaks of fluid in, and removing said fluid from, a definite area to be tested, in ground and building walls, comprising in combination:
  (a) a mobile carrier;
  (b) a rotatable drill assembly insertable into and removable from said area comprising an elongated tubular member having an upper end and a lower end and a longitudinal bore, and of a drill bit threaded onto said lower end;
  (c) driving and rotating means connected to the upper end portion of said drill assembly;
  (d) a plurality of apertures located in the lower portion of said drill member, in the tubular member thereof, and communicating through the wall of said tubular member with said bore and with the exterior of said tubular member;
  (e) separate means adapted to impose in said bore a pressure and a vacuum, respectively;
  (f) a mounting plate in front of said rigid support, and movable up and down relative to said support, on vertical slideways attached to the vertical sides of said support;
  (g) supporting means projecting outwardly from said mounting plate and at right angle thereto, and supporting said driving and rotating means;
  (h) a kingpin connected to said mobile carrier and supporting said mounting plate rotatably;

(i) a ring gear rotatably mounted on said kingpin, and means to angularly displace said ring gear with respect to said kingpin;

(j) means to secure said ring gear in the desired angular position, which is equally taken by said mounting plate and said drill assembly.

4. A machine according to claim 1, in which the outer portion of the wall of said tubular element of the drill assembly has a grooved helical flight.

References Cited by the Examiner
UNITED STATES PATENTS

| | | | |
|---|---|---|---|
| 207,064 | 8/78 | Pontez | 175—213 |
| 1,377,575 | 5/21 | Greve | 173—57 |
| 1,398,551 | 11/21 | Hanson | 173—57 |
| 1,882,350 | 11/32 | Weiss | 173—149 |
| 2,048,072 | 7/36 | Johansen | 173—149 |
| 2,565,224 | 8/51 | Gibbens | 173—22 |
| 2,797,066 | 6/57 | Sewell | 175—207 |
| 2,809,014 | 10/57 | Lawrence et al. | 175—323 |
| 3,022,840 | 2/62 | Hohos et al. | 175—213 |
| 3,084,553 | 4/63 | Cullinan et al. | 175—21 |

BROUGHTON G. DURHAM, *Primary Examiner.*